(12) United States Patent
Yang et al.

(10) Patent No.: US 12,402,160 B2
(45) Date of Patent: Aug. 26, 2025

(54) ACCESSING A SATELLITE COMMUNICATION SYSTEM AND A LAND BASED WIRELESS COMMUNICATION SYSTEM

(71) Applicant: Apple Inc., Cupertino, CA (US)

(72) Inventors: Hailong Yang, San Francisco, CA (US); Alex Yee Kit Ho, San Jose, CA (US); Guojie Dong, Cupertino, CA (US); Kexin Ma, San Diego, CA (US); Li Sheng, Santa Clara, CA (US); Muthukumaran Dhanapal, Sunnyvale, CA (US); Rajesh Ambati, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 400 days.

(21) Appl. No.: 17/876,785

(22) Filed: Jul. 29, 2022

(65) Prior Publication Data

US 2023/0073408 A1  Mar. 9, 2023

Related U.S. Application Data

(60) Provisional application No. 63/239,053, filed on Aug. 31, 2021.

(51) Int. Cl.
*H04W 72/56* (2023.01)
*H04W 48/18* (2009.01)
(Continued)

(52) U.S. Cl.
CPC ........... *H04W 72/56* (2023.01); *H04W 48/18* (2013.01); *H04W 72/542* (2023.01); *H04W 84/18* (2013.01)

(58) Field of Classification Search
None
See application file for complete search history.

(56) References Cited

U.S. PATENT DOCUMENTS

| | | | |
|---|---|---|---|
| 2013/0301511 A1* | 11/2013 | Jo ........................ | H04W 72/27 370/312 |
| 2015/0020157 A1* | 1/2015 | Kim ...................... | H01Q 1/243 455/517 |

(Continued)

FOREIGN PATENT DOCUMENTS

CN          106354509 B   * 11/2020 ............. G06F 21/31

*Primary Examiner* — Christopher M Crutchfield
(74) *Attorney, Agent, or Firm* — Sterne, Kessler, Goldstein & Fox P.L.L.C.

(57) ABSTRACT

Mechanisms are provided for a user equipment (UE) to determine to use a shared resource such as an antenna to access a land based wireless communication system or a satellite communication system. The UE can provide a first priority indication to indicate whether to access the land based wireless communication system based on one or more wireless link metrics of the land based wireless communication system or one or more application metrics for applications using the land based wireless communication system; and provide a second priority indication to indicate whether to access the satellite wireless communication system based on one or more service metrics provided by the satellite wireless communication system. The UE can determine to use the shared resources to access the land based wireless communication system or the satellite communication system based on the first priority indication and the second priority indication.

20 Claims, 6 Drawing Sheets

(51) Int. Cl.
*H04W 72/542* (2023.01)
*H04W 84/18* (2009.01)

(56) References Cited

U.S. PATENT DOCUMENTS

| | | | | |
|---|---|---|---|---|
| 2018/0091962 A1* | 3/2018 | Hernandez | .............. | G01S 19/17 |
| 2018/0331714 A1* | 11/2018 | See | ...................... | H04B 7/0814 |
| 2020/0322891 A1* | 10/2020 | Östman | ................... | G01S 19/36 |
| 2021/0029662 A1* | 1/2021 | Son | ....................... | H04W 76/14 |
| 2021/0099205 A1* | 4/2021 | Seyed | .................. | H04B 7/0805 |
| 2021/0225093 A1* | 7/2021 | Hergesheimer | ........ | G07C 5/008 |

* cited by examiner

ACCESSING A SATELLITE COMMUNICATION SYSTEM AND A LAND BASED WIRELESS COMMUNICATION SYSTEM

CROSS REFERENCE TO RELATED APPLICATIONS

The present application claims priority to U.S. provisional patent application No. 63/239,053, filed on Aug. 31, 2021, which is incorporated by reference herein in its entirety.

FIELD

The described aspects generally relate to accessing a satellite communication system or a land based wireless communication system from a user equipment (UE).

RELATED ART

A wireless communication system can include a fifth generation (5G) system, a new radio (NR) system, a long term evolution (LTE) system, a satellite communication system, a combination thereof, or some other wireless systems. In addition, a wireless communication system can support a wide range of use cases such as enhanced mobile broad band (eMBB), massive machine type communications (mMTC), ultra-reliable and low-latency communications (URLLC), enhanced vehicle to anything communications (eV2X), among others.

SUMMARY

Some aspects of this disclosure relate to apparatuses and methods for implementing techniques for a user equipment (UE) to access a land based wireless communication system or a satellite communication system using a shared resource based on multiple priority indications derived from one or more wireless link metrics of the land based wireless communication system, one or more application metrics for applications using the land based wireless communication system, or one or more service metrics provided by the satellite wireless communication system. In some embodiments, the UE can access the land based wireless communication system or the satellite communication system using a shared antenna or other shared resources. In embodiments, the satellite wireless communication system may include a global navigation satellite systems (GNSS), and the land based wireless communication system can include a wireless communication system based on 3rd Generation Partnership Project (3GPP) release 15 (Rel-15), release 16 (Rel-16), release 17 (Rel-17), or beyond, a new radio (NW) system, a long term evolution (LTE) system, or any other wireless system.

Some aspects of this disclosure relate to a UE. The UE can include an antenna shared to access a satellite communication system or a land based wireless communication system. The UE can further include one or more processors communicatively coupled to the antenna and configured to perform various operations. The one or more processors can be configured to provide a first priority indication to indicate whether to use the antenna to access the land based wireless communication system based on one or more wireless link metrics of the land based wireless communication system or one or more application metrics for applications using the land based wireless communication system; and provide a second priority indication to indicate whether to use the antenna to access the satellite wireless communication system based on one or more service metrics provided by the satellite wireless communication system. In addition, the one or more processors can be configured to determine to use the antenna to access the land based wireless communication system or the satellite communication system based on the first priority indication and the second priority indication.

According to some aspects, the one or more processors can be implemented by a baseband circuit or a baseband processor. In addition, the one or more application metrics or the one or more service metrics provided by the satellite wireless communication system may be provided by an application circuit or an application processor coupled to the baseband circuit or the baseband processor. The first priority indication or the second priority indication may include a digital binary signal having a 0 or 1 Boolean value.

According to some aspects, the satellite communication system may include a global navigation satellite system (GNSS), and the land based wireless communication system may include at least a cellular wireless system. The one or more wireless link metrics of the land based wireless communication system may include a Radio Resource Control (RRC) state metric, a cellular link metric, a voice call status, or an out of service (OOS) indication. The one or more application metrics may include data usage statistics information for one or more applications operated on the UE. The one or more service metrics may include an indication whether an GNSS L5 service is provided.

According to some aspects, the one or more processors may determine to use the antenna to access the cellular wireless communication system when the one or more wireless link metrics indicate the UE is in a Radio Resource Control (RRC) connected state, in a voice call state, in an out of service state, or the UE accesses the cellular wireless system using a legacy radio access technology (RAT). In addition, the one or more processors may determine to use the antenna to access the satellite communication system when the one or more application metrics indicate a low data usage compared to a high data usage record saved before and the one or more service metrics provided by the satellite wireless communication system indicates a request for a L5 service.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
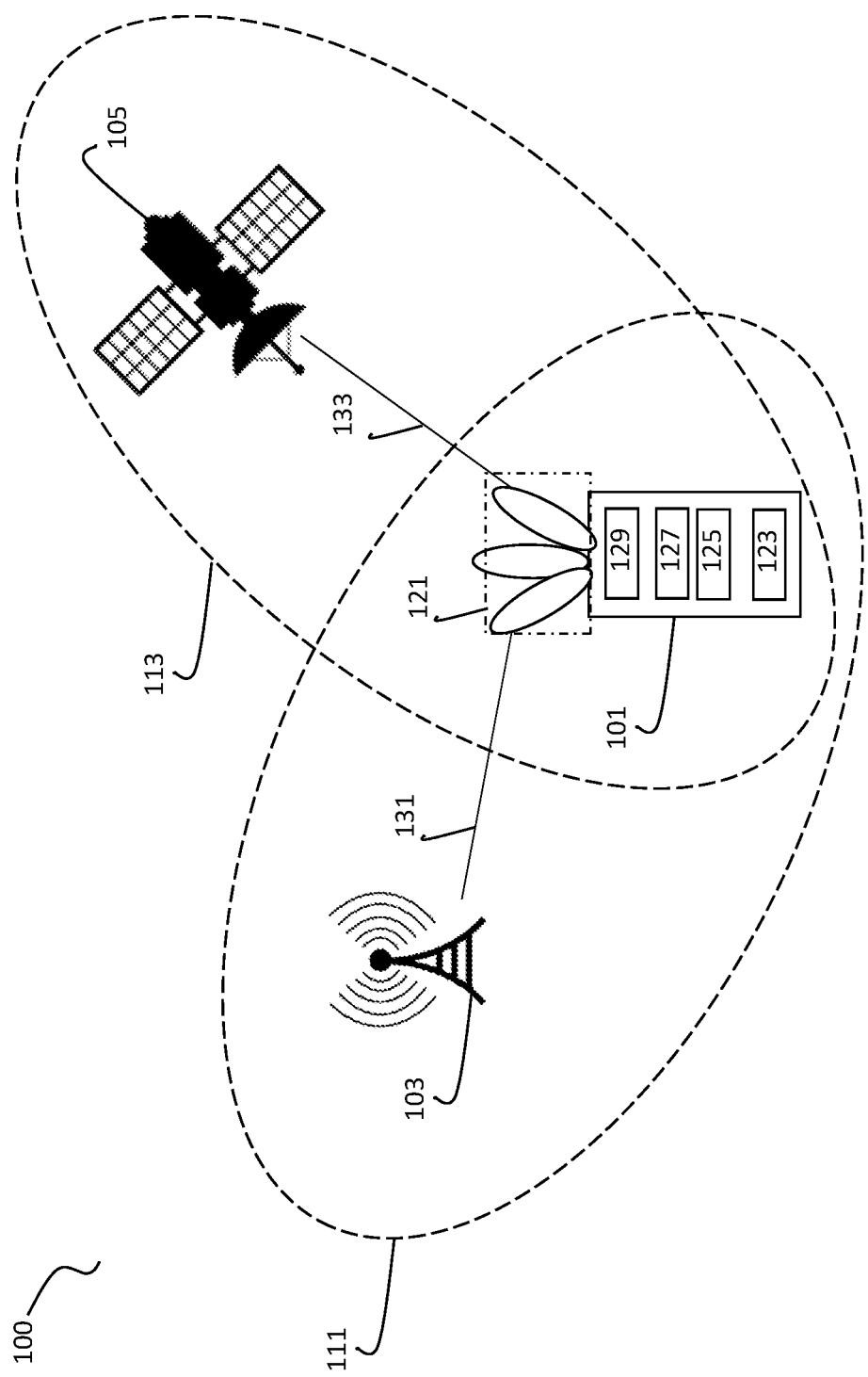
FIG. 1 illustrates a wireless communication system including a user equipment (UE) to communicate with a satellite communication system or a land based wireless communication system, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

There can be various wireless communication systems including satellite communication systems, land based wireless communication systems, a combination of both, or other kinds of wireless communication systems. The satellite communication system can include a global navigation satellite system (GNSS), and the land based wireless communication system can include at least a cellular wireless system. For example, a non-terrestrial wireless networks (NTN) can refer to any network that involves non-terrestrial flying objects. An NTN can include a satellite communication network, a high altitude platform systems (HAPS), an air-to-ground network, a low-altitude unmanned aerial vehicles (UAVs, aka. drones), or any other NTN network. In some embodiments, a user equipment (UE) can communicate with a satellite communication system and a land based wireless communication system using some shared resources, such as one or more antennas.

With the advance of semiconductor manufacturing process and new form factors, the space is more condensed for any devices or circuits. Accordingly, antennas may be either shared or coupled between cellular and other technologies like WiFi, bluetooth, GNSS. In GNSS L5, due to the large frequency difference (1176 MHz) from cellular frequencies, antennas can typically either serve GNSS L5 or cellular systems with good performance, but not concurrently. If the UE tunes the antennas to the cellular systems, the UE may loss performance in GNSS L5 services. Similarly, if the UE tunes the antennas to GNSS L5 services, the UE may loss performance in the cellular systems, sometimes having a loss of cellular diversity (up to 15-30% throughput loss). Conventionally, a UE may only allocate the shared resource such as antennas to the GNSS L5 services when cellular system services go to sleep (idle sleep or connected discontinuous reception (CDRX) mode, etc.), which can be inefficient.

Some aspects of this disclosure provide mechanisms for a UE to access a land based wireless communication system or a satellite communication system based on multiple priority indications derived from one or more wireless link metrics of the land based wireless communication system, one or more application metrics for applications using the land based wireless communication system, or one or more service metrics provided by the satellite wireless communication system. Accordingly, the UE may make a determination to use the antenna to access the land based wireless communication system or the satellite communication system based on multiple factors, and the determination may be made in multiple steps or layers. In some embodiments, the UE can access the land based wireless communication system or the satellite communication system using a shared antenna. The mechanisms can be implemented in hardware such as circuits, software running on a processor, a combination of both.

FIG. 1 illustrates a wireless communication system 100 including a UE 101 to communicate with a satellite communication system 113 or a land based wireless communication system 111, according to some aspects of the disclosure. Wireless system 100 is provided for the purpose of illustration only and does not limit the disclosed aspects.

In some embodiments, wireless communication system 100 can include, but is not limited to, UE 101, land based wireless communication system 111 including a base station 103, satellite communication system 113 including a satellite 105. In some embodiments, there can be a base station located on satellite 105. UE 101 can include an antenna 121, one or more processors 123, and can communicate with base station 103 through a link 131, and communicate with satellite 105 through a link 133. There can be multiple satellites with onboard base stations communicating with each other. There can be other network entities, e.g., network controller, a relay station, a gateway and a core network, not shown.

In some embodiments, land based wireless communication system 111 can include at least a cellular wireless system. Land based wireless communication system 111 may not be limited to completely based on land, and can include a satellite as well. For example, land based wireless communication system 111 can be an NTN system that includes a cellular wireless system as a part of the NTN system. In the description below, a cellular wireless system may be used as an example of a land based wireless communication system 111. However, techniques described for a cellular wireless system can be applicable to other land based wireless communication system.

In some embodiments, satellite communication system 113 can include a global navigation satellite system (GNSS) that includes satellite 105, a HAPS, or an air-to-ground network, or a UAV. Satellite 105 can be a low Earth orbiting (LEO) satellite, a medium Earth orbiting (MEO) satellite, or a geosynchronous Earth orbiting (GEO) satellite. Satellite communication system 113 can be a HAPS, which can be an airborne platform including airplanes, balloons, and airships. For example, satellite communication system 113 can include the International Mobile Telecommunications base stations, known as HIBS. A RIBS system can provides mobile service in the same transmission frequencies used by terrestrial mobile networks. Satellite communication system 113 can be an air-to-ground network to provide in-flight connectivity for airplanes by utilizing ground stations which play a similar role as base stations in terrestrial mobile networks. Satellite communication system 113 can also be a mobile enabled low-altitude UAVs.

In some embodiments, satellite 105 can be a GEO satellite deployed at an altitude of 35786 Km and is characterized by a slow motion around its orbital position with respect to a point on the Earth. Compared to terrestrial cellular systems, communication networks based on a GEO satellite have a large propagation delay that has to be taken into account in the overall design of the satellite network and high propagation losses. Additionally and alternatively, satellite 105 can be a LEO satellite at an altitude of 300-3000 km. As a consequence, satellite 105 can have a lower propagation delay, lower propagation losses and a higher Doppler frequency shift than a GEO satellite.

According to some aspects, base station 103 can be a fixed station or a mobile station. Base station 103 can also be called other names, such as a base transceiver system (BTS), an access point (AP), a transmission/reception point (TRP), an evolved NodeB (eNB), a next generation node B (gNB), a 5G node B (NB), or some other equivalent terminology.

According to some aspects, UE 101 can be stationary or mobile. UE 101 can be a handheld terminal or a very small aperture terminal (VSAT) that is equipped with parabolic antennas and typically mounted on buildings or vehicles. UE 101 can be a cellular phone (e.g., a smart phone), a personal digital assistant (PDA), a wireless modem, a wireless communication device, a handheld device, a laptop, a desktop, a cordless phone, a wireless local loop station, a tablet, a camera, a gaming device, a netbook, an ultrabook, a medical device or equipment, a biometric sensor or device, a wearable device (smart watch, smart clothing, smart glasses, smart wrist band, smart jewelry such as smart ring or smart bracelet), an entertainment device (e.g., a music or video device, or a satellite radio), a vehicular component, a smart meter, an industrial manufacturing equipment, a global positioning system device, an Internet-of-Things (IoT) device, a machine-type communication (MTC) device, an evolved or enhanced machine-type communication (eMTC) device, or any other suitable device that is configured to communicate via a wireless medium. For example, a MTC and eMTC device can include, a robot, a drone, a location tag, and/or the like.

According to some aspects, UE 101 may have an application operated by processor 123 to generate one or more application metrics 125. In addition, UE 101 may obtain one or more wireless link metrics 127 of land based wireless communication system 111 for link 131, and one or more service metrics 129 provided by satellite wireless communication system 113. One or more application metrics 125, one or more wireless link metrics 127 of land based wireless communication system 111, and one or more service metrics 129 provided by satellite wireless communication system 113 may be stored in a memory or storage device within UE 101.

Figure 2:
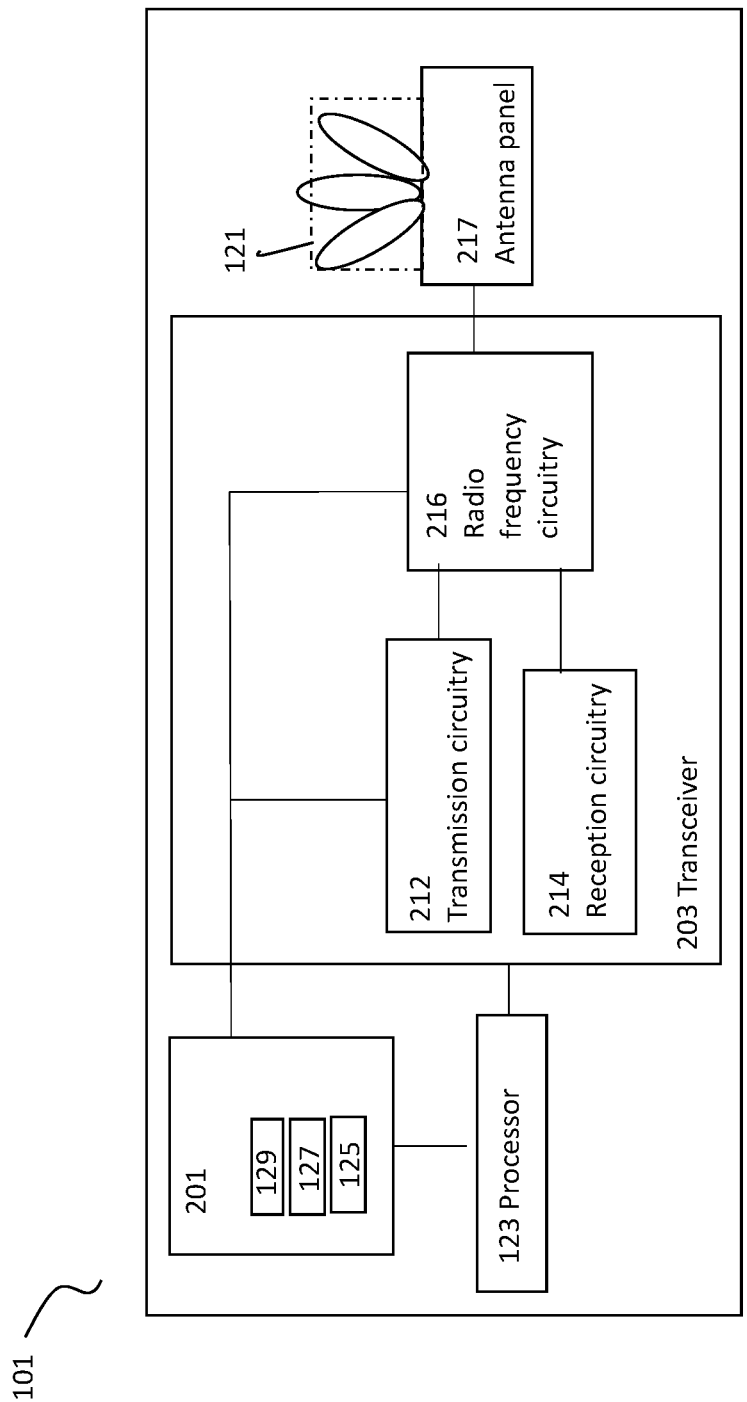
FIG. 2 illustrates a block diagram of a UE, according to some aspects of the disclosure.

According to some aspects, UE 101 can be implemented according to a block diagram as illustrated in FIG. 2. Referring to FIG. 2, UE 101 can have antenna panel 217 including one or more antenna elements to form various transmission beams of antenna 121, coupled to a transceiver 203 and controlled by processor 123. Transceiver 203 and antenna panel 217 (using transmission beam of antenna 121) can be configured to enable wireless communication in a wireless network. In detail, transceiver 203 can include radio frequency (RF) circuitry 216, transmission circuitry 212, and reception circuitry 214. RF circuitry 216 can include multiple parallel RF chains for one or more of transmit or receive functions, each connected to one or more antenna elements of the antenna panel. In addition, processor 123 can be communicatively coupled to a memory 201, which are further coupled to the transceiver 203. Various data can be stored in memory 201. In some examples, memory 201 can store one or more application metrics 125, one or more wireless link metrics 127 of land based wireless communication system 111, and one or more service metrics 129 provided by satellite wireless communication system 113. In some embodiments, one or more application metrics 125 can include data usage statistics information for one or more applications operated on UE 101. One or more wireless link metrics 127 can include a Radio Resource Control (RRC) state metric, a cellular link metric, a voice call status, or an out of service (OOS) indication. One or more service metrics 129 can include an indication whether a GNSS L5 service is provided.

In some embodiments, memory 201 can include instructions, that when executed by the processor 123 perform operations described herein, e.g., operations to communicate with a satellite communication system or a land based wireless communication system using a shared resource such as a shared antenna, and the decision of which communication system to use. Alternatively, processor 123 can be "hard-coded" to perform the operations described herein, such as processor 400 described in FIG. 4.

Figure 3A:
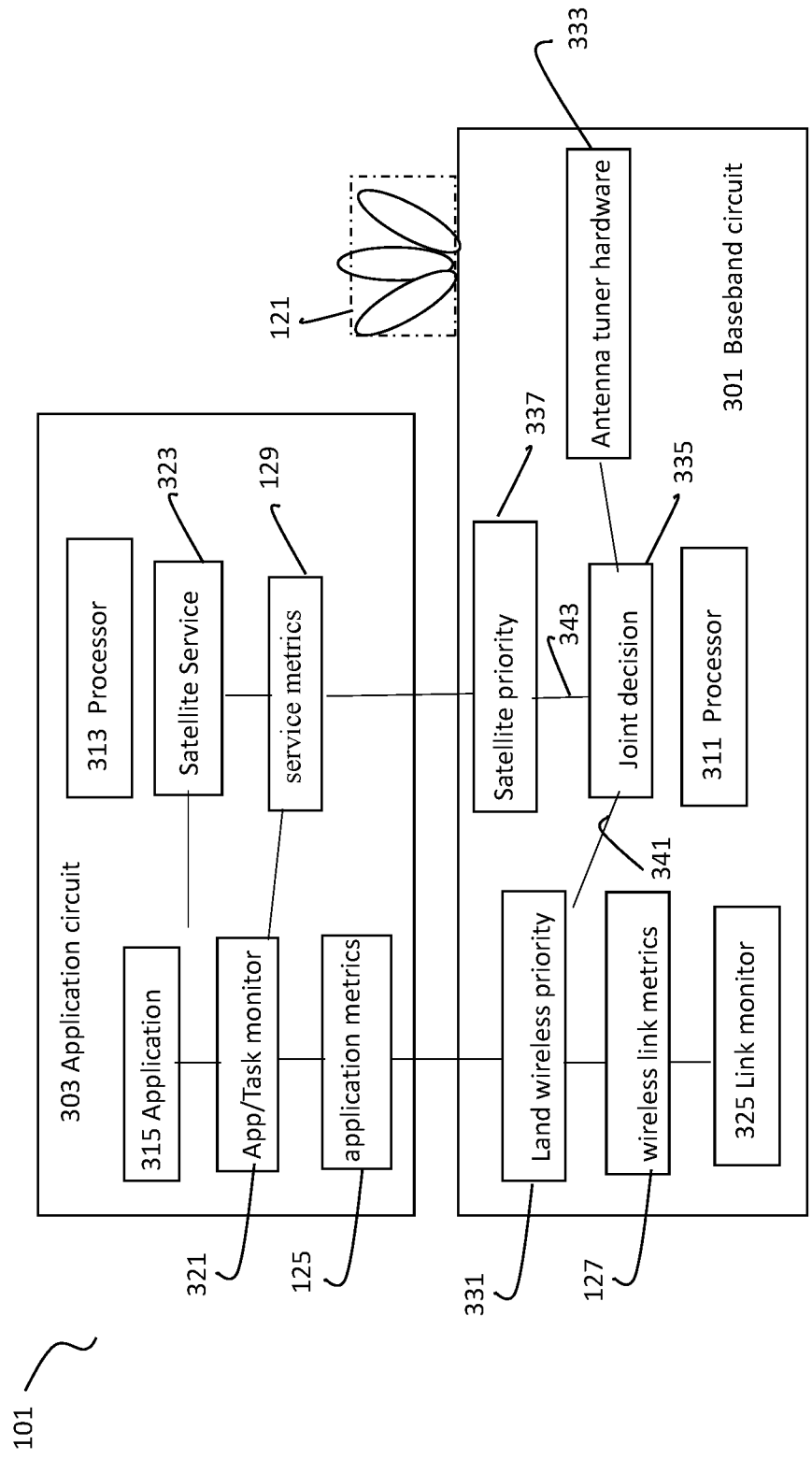
FIGS. 3A-3B illustrate block diagrams of a UE to communicate with a satellite communication system or a land based wireless communication system, according to some aspects of the disclosure.
Figure 3B:
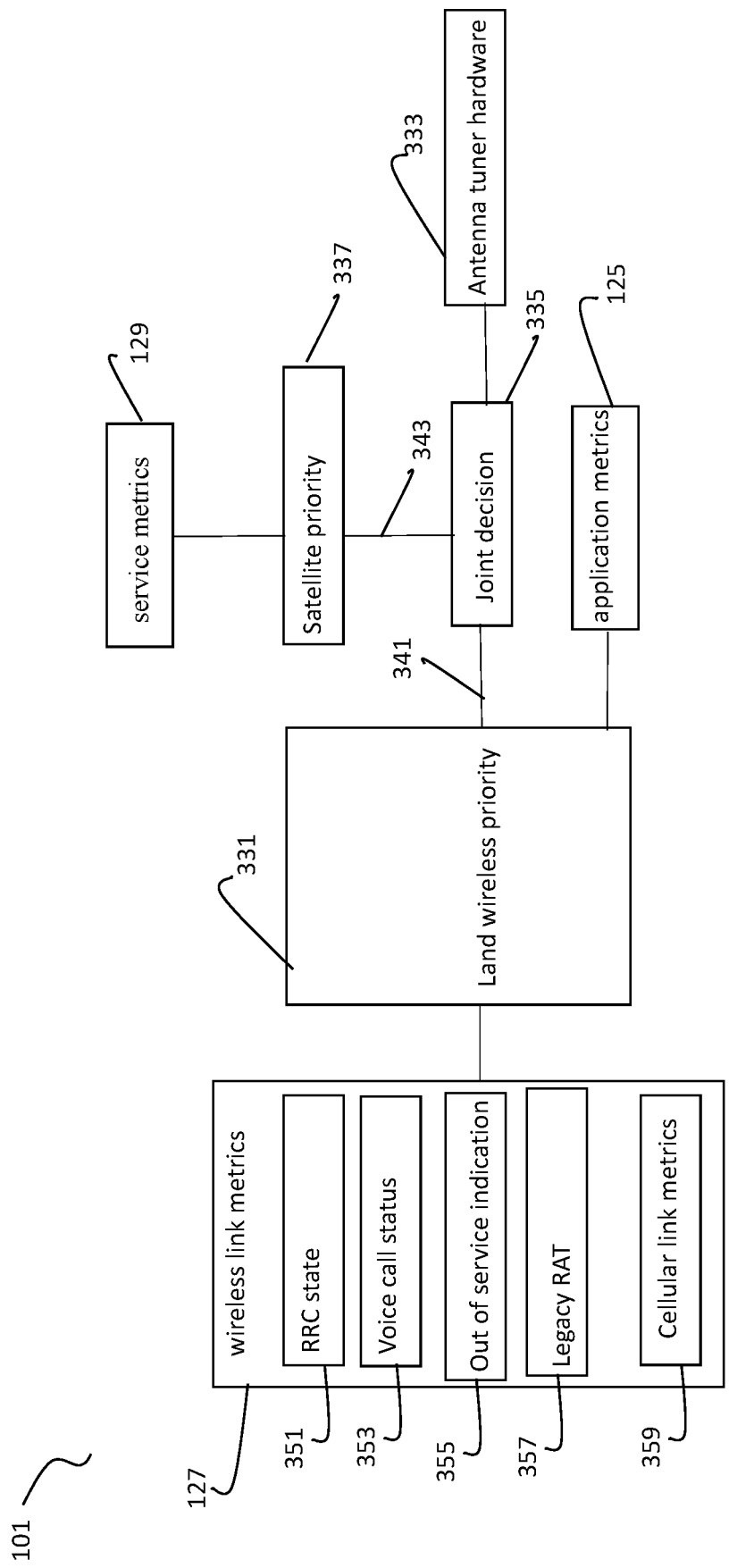

FIGS. 3A-3B illustrate block diagrams of UE 101 to communicate with a satellite communication system or a land based wireless communication system, according to some aspects of the disclosure. Implementations of UE 101 shown in FIGS. 3A-3B may be examples of UE 101 shown in FIG. 2.

In some embodiments, UE 101 can include a baseband circuit 301 and an application circuit 303 coupled to baseband circuit 301. Baseband circuit 301 can include a processor 311, and application circuit 303 can include a processor 313, where processor 311 and processor 313 can be examples of the one or more processors 123. An application 315 may be operated by processor 313 on application circuit 303, where application 315 may use land based wireless communication system 111. Additionally, a satellite service 323 may be operated by processor 313 on application circuit 303, where satellite service 323 may use satellite wireless communication system 113. An application or task monitor 321 may be operated by processor 313 to monitor application 315 to collect one or more application metrics 125, to monitor satellite service 323 to collect one or more service metrics 129. In some embodiments, application or task monitor 321 may provide one or more application metrics 125 as numerical values. Additionally and alternatively, one or more application metrics 125 can be provided as discrete quantized values such as high throughput or low throughput. In addition, there may be a confidence value associated with a value of application metrics 125. For example, application metrics 125 may indicate a high or low throughput, with high or low confidence. Similarly, one or more service metrics 129 can provide input on GNSS L5 priority to let baseband processor 311 know if L5 is requested by satellite service 323 for high location accuracy. One or more service metrics 129 may include other requests such as GNSS L1 request. Accordingly, one or more application metrics 125 or the one or more service metrics 129 can be provided by application circuit 303 or an application processor 313 to baseband circuit 301 or baseband processor 311. In addition, a link monitor 325 may be located on baseband 301 to monitor the link conditions for link 131 to generate one or more wireless link metrics 127. In some embodiments, the link conditions for link 131 may include link quality metrics such as signal-to-noise ratio (SNR) or Reference Signal Received Power (RSRP) of link 131.

In some embodiments, based on one or more application metrics 125, one or more wireless link metrics 127, and one or more service metrics 129, processor 313 can determine to control antenna tuner circuit 333 to tune antenna 121 to access land based wireless communication system 111 or satellite communication system 113. In detail, one or more application metrics 125 and one or more wireless link metrics 127 may be provided to a land wireless priority module 331 to generate a first priority indication 341 to indicate whether to use antenna 121 to access land based wireless communication system 111. In addition, one or more service metrics 129 can be provided to a satellite priority module 337 to generate a second priority indication 343 to indicate whether to use antenna 121 to access satellite wireless communication system 113. In some embodiments, the first priority indication 341 or the second priority indication 343 can include a digital binary signal having a 0 or 1 Boolean value. In some embodiments, the first priority indication 341 or the second priority indication 343 can include a numeral or other discrete labels to indicate the priority. Afterwards, based on the first priority indication 341 or the second priority indication 343, a joint decision module 335 can determine to use antenna 121 to access land based wireless communication system 111 or satellite communication system 113 based on the first priority indication 341 and the second priority indication 343. Accordingly, land wireless priority module 331 may only make a determination that land based wireless communication system 111 is to be accessed or not, without determining whether to access satellite wireless communication system 113. Similarly, satellite priority module 337 may only make a determination that satellite wireless communication system 113 is to be accessed or not, without determining whether to access land based wireless communication system 111. Joint decision module 335 can make a final determination based on the first priority indication 341 determined by land wireless priority module 331 and the second priority indication 343 determined by satellite priority module 337.

In some embodiments, as shown in FIG. 3B, one or more wireless link metrics 127 can indicate UE 101 is in a RRC connected state 351 (connected or idle), in a voice call state 353 (voice call on or off), in an out of service state 355 (out of service or not), or in a state 357 accessing the cellular wireless system using a legacy radio access technology (RAT) (legacy RAT or not). In addition, one or more wireless link metrics 127 can include various cellular link metrics such as SNR or RSRP measurement of link 131, which can be numerical values or discrete indications such as RSRP/SNR good or bad. Accordingly, processor 311 can be configured to determine to use antenna 121 to access a cellular wireless communication system when the first priority indication 341 indicates the UE is in a RRC connected state, in a voice call state, in an out of service state, or the UE accesses the cellular wireless system using a legacy RAT.

In some embodiments, processor 311 can be configured to determine to use the antenna to access the satellite communication system when the one or more application metrics indicate a low data usage compared to a high data usage record saved before and the one or more service metrics provided by the satellite wireless communication system indicates a request for a L5 service.

In some other embodiments, land wireless priority module 331, satellite priority module 337, and joint decision module 335 may be implemented by hardware, such as application specific integrated circuit (ASIC) that may include logic operations such as logic AND, OR operations using transistors. As shown in FIGS. 3A-3B, joint decision module 335 makes the determination to access a cellular wireless communication system or a satellite wireless communication system based on two priority indications: the first priority indication 341 and the second priority indication 343.

Figure 4:
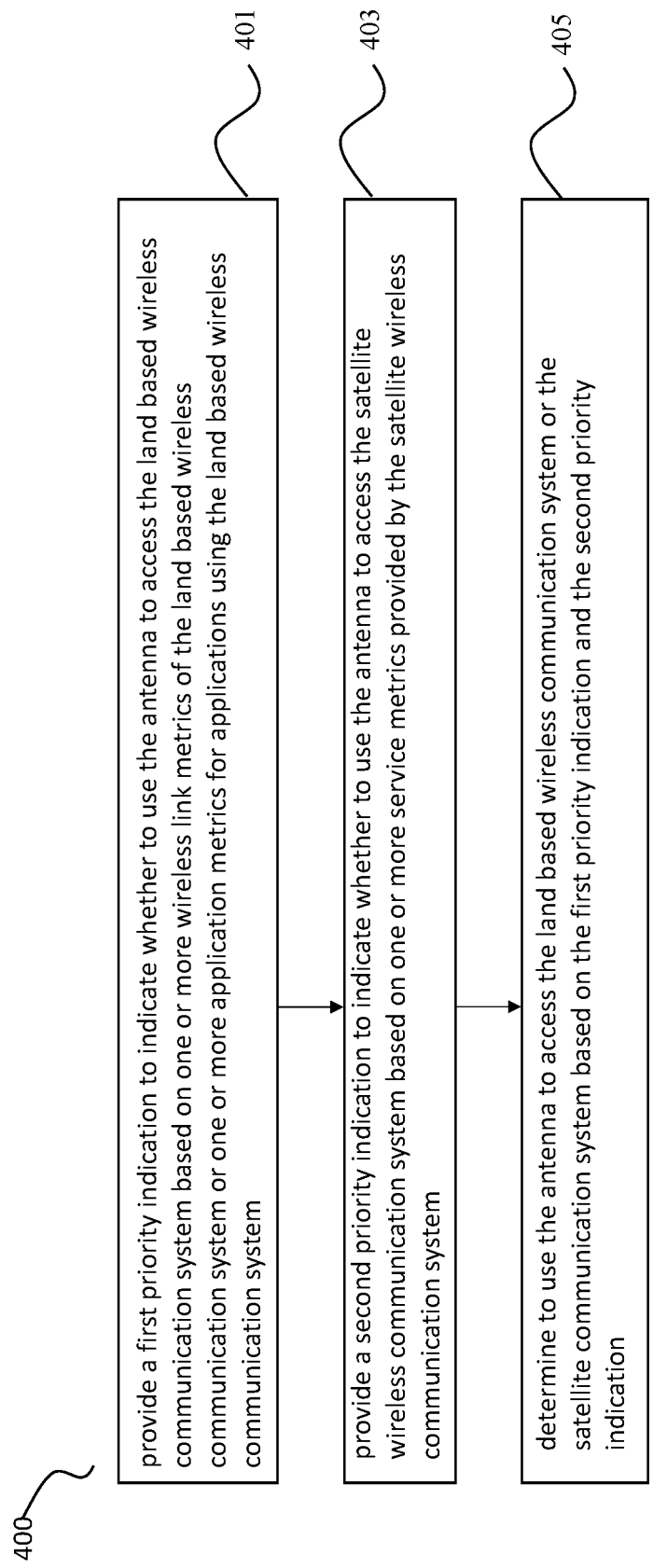
FIG. 4 illustrates an example process performed by a UE to communicate with a satellite communication system or a land based wireless communication system, according to some aspects of the disclosure.

In some embodiments, land wireless priority module 331, satellite priority module 337, and joint decision module 335 may be implemented by software operated by processor 311 to perform a process 400 as shown in FIG. 4. As described above, processor 311 can be an example of processor 123, and land wireless priority module 331, satellite priority module 337, and joint decision module 335 may be implemented by software operated by processor 123 to perform a process 400 as well.

At 401, processor 311 can be configured to provide the first priority indication 341 to indicate whether to use antenna 121 to access land based wireless communication system 111 based on one or more wireless link metrics 127 or one or more application metrics 125 for applications using land based wireless communication system 111. For example, the first priority indication 341 can be provided by land wireless priority module 331.

At 403, processor 311 can be configured to provide the second priority indication 343 to indicate whether to use antenna 121 to access satellite wireless communication system 131 based on one or more service metrics 129 provided by the satellite wireless communication system. For example, the second priority indication 343 can be provided by satellite priority module 337.

At 405, processor 123 can determine to use antenna 121 to access land based wireless communication system 111 or satellite communication system 113 based on the first priority indication 341 and the second priority indication 343. For example, joint decision module 335 can determine to use antenna 121 to access land based wireless communication system 111 or satellite communication system 113 based on the first priority indication 341 and the second priority indication 343.

Accordingly, the decision to access a cellular wireless communication system or a satellite wireless communication system can be made in a two-step fashion, where two priority indications, the first priority indication 341 and the second priority indication 343, are generated first by land wireless priority module 331 and satellite priority module 337, respectfully. Afterwards, the first priority indication 341 and the second priority indication 343 are fed into joint decision module 335.

In some other embodiments, a different implementation can be used where joint decision module 335 may consider all factors of one or more application metrics 125, one or more wireless link metrics 127 of land based wireless communication system 111, and one or more service metrics 129, and may determine to access a cellular wireless communication system or a satellite wireless communication system based on some access policies related to all the factors.

In some embodiments, processor 123 or processor 311 can determine to use antenna 121 to access land based wireless communication system 111, such as a cellular wireless system when one or more wireless link metrics 127 indicates that UE 101 is in a RRC connected state, in a voice call state, in a legacy RAT state such as Global System for Mobiles (GSM) and Code Division Multiple Access (CDMA), or in an out of service state when UE 101 may retain antenna 121 during cell search. In some embodiments, processor 123 can determine to use antenna 121 to access land based wireless communication system 111 when one or more wireless link metrics 127 indicates that the RSRP/SNR measurement is below a threshold, where land based wireless communication system 111 can be a NR system, a 5G system, a LTE system, or a WCDMA system. (Inventors, please double check the description about RSRP/SRN measurement being below a threshold is the correct description). In some embodiments, processor 123 can determine to use antenna 121 to access land based wireless communication system 111 when UE 101 is in a RRC connected state and there is a high throughput data application running, e.g., high cellular data usage, which can include data stall/video streaming/VoIP/Personal Handy phone Systems (PHS).

In some embodiments, in an out of service state, processor 123 can determine to retain antenna 121 for the cellular wireless service during cell search, but release antenna 121 to GNSS L5 during the time UE 101 is at a sleep state. Similarly, in a RRC idle case, processor 123 can determine to retain antenna 121 for the cellular wireless service during cell search, but release antenna 121 to GNSS L5 during the time UE 101 is at a sleep state. In some embodiments, processor 123 can determine to release antenna 121 to GNSS L5 services when L5 is highly desired by GNSS.

In some embodiments, based on application metrics 125, there may be two modes that can be selected to access a cellular system or a GNSS L5 system based on some access policies considering both data usage and confidence on the application metrics 125. For GNSS L5 favored, cellular system will give antenna 121 to GNSS L5 system. This indication can significantly improve the GNSS experiences, especially when users have navigation application running which requests both high location accuracy and cellular data usage. Device also would check for the foreground traffic class and if the traffic class belongs to a traffic daemon of interest (geoD for example) then the traffic class input will be considered as a critical parameter in the joint decision.

TABLE 1

| AP Metric | Meaning | Cellular Favored | GNSS L5 Favored |
|---|---|---|---|
| Data usage high with high confidence | High throughput app running | cellular | cellular |
| Data usage high with low confidence | Screen unlocked, no high throughput application running | cellular | GNSS L5 |
| Data usage low with high confidence | Screen locked | GNSS L5 | GNSS L5 |

Figure 5:
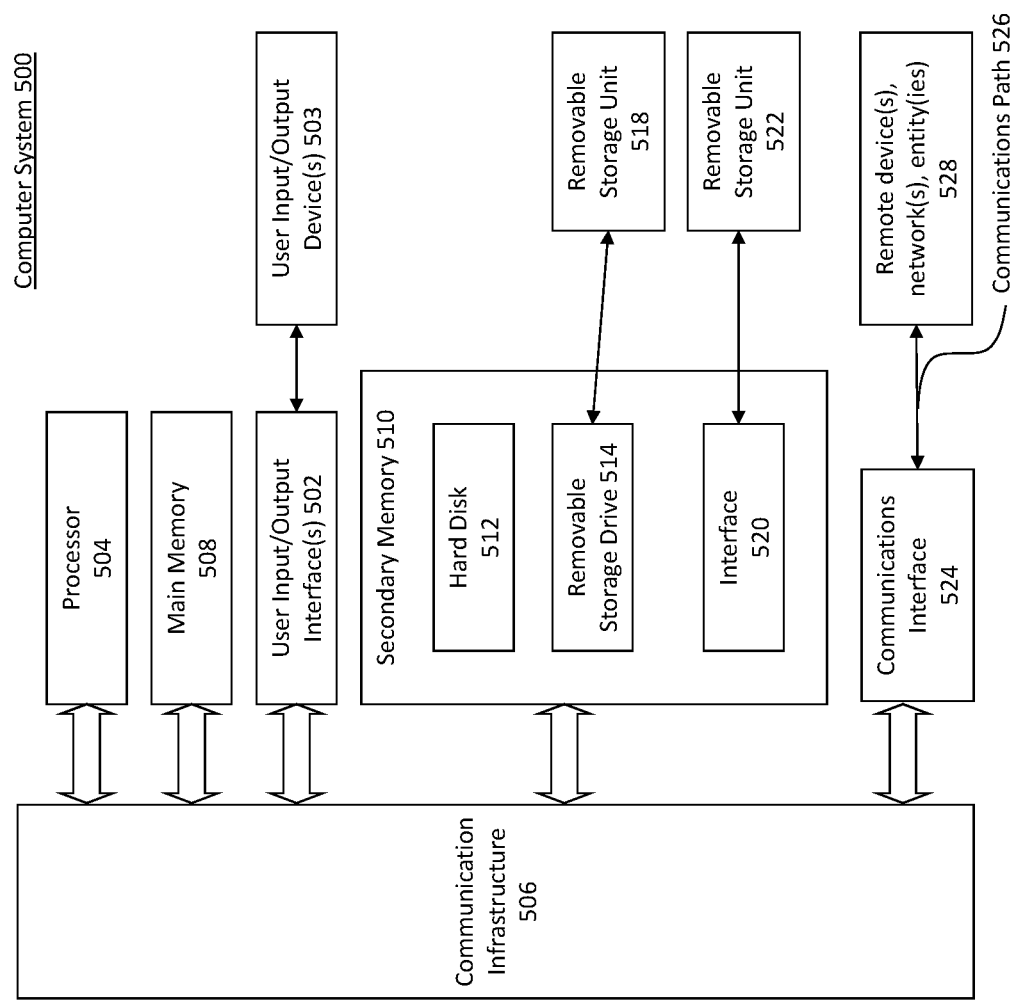
FIG. 5 is an example computer system for implementing some aspects or portion(s) thereof of the disclosure provided herein.

Various aspects can be implemented, for example, using one or more computer systems, such as computer system 500 shown in FIG. 5. Computer system 500 can be any computer capable of performing the functions described herein such as UE 101, or base station 103 as shown in FIG. 1 and FIG. 2, for operations described for UE 101 or process 400 as shown in FIGS. 3A, 3B, and 4. Computer system 500 includes one or more processors (also called central processing units, or CPUs), such as a processor 504. Processor 504 is connected to a communication infrastructure 506 (e.g., a bus). Computer system 500 also includes user input/output device(s) 503, such as monitors, keyboards, pointing devices, etc., that communicate with communication infrastructure 506 through user input/output interface(s) 502. Computer system 500 also includes a main or primary memory 508, such as random access memory (RAM). Main memory 508 may include one or more levels of cache. Main memory 508 has stored therein control logic (e.g., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to some aspects, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some examples, main memory 508, the removable storage unit 518, the removable storage unit 522 can store instructions that, when executed by processor 504, cause processor 504 to perform operations for a UE or a base station, e.g., UE 101, or base station 103 as shown in FIG. 1 and FIG. 2, for operations described for UE 101 or process 400 as shown in FIGS. 3A, 3B, and 4.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526. Operations of the communication interface 524 can be performed by a wireless controller, and/or a cellular controller. The cellular controller can be a separate controller to manage communications according to a different wireless communication technology. The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 500, main memory 508, secondary memory 510 and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 5. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

For one or more embodiments or examples, at least one of the components set forth in one or more of the preceding figures may be configured to perform one or more operations, techniques, processes, and/or methods as set forth in the example section below. For example, circuitry associated with a thread device, routers, network element, etc. as described above in connection with one or more of the preceding figures may be configured to operate in accordance with one or more of the examples set forth below in the example section.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A user equipment (UE), comprising:
an antenna shared to access a satellite communication system or a land based wireless communication system;
one or more processors communicatively coupled to the antenna and configured to:
provide a first priority indication to indicate whether to use the antenna to access the land based wireless communication system based on one or more wireless link metrics of the land based wireless communication system or one or more application metrics for applications using the land based wireless communication system;
provide a second priority indication to indicate whether to use the antenna to access the satellite communication system based on one or more service metrics provided by the satellite communication system; and
determine to use the antenna to access the land based wireless communication system or the satellite communication system based on the first priority indication and the second priority indication, and determine to retain the antenna for the land based wireless communication system during a cell search in a Radio Resource Control (RRC) idle case, and release the antenna to the satellite communication system during a time when a screen of the UE is locked.

2. The UE of claim 1, wherein the satellite communication system includes a global navigation satellite system (GNSS), and the land based wireless communication system includes at least a cellular wireless system.

3. The UE of claim 2, wherein the one or more wireless link metrics of the land based wireless communication system includes an RRC state metric, a cellular link metric, a voice call status, or an out of service (OOS) indication.

4. The UE of claim 2, wherein the one or more application metrics includes data usage statistics information for one or more applications operated on the UE.

5. The UE of claim 2, wherein the one or more service metrics includes an indication whether a GNSS L5 service is provided.

6. The UE of claim 2, wherein the one or more processors are implemented by a baseband circuit or a baseband processor.

7. The UE of claim 6, wherein the one or more application metrics or the one or more service metrics provided by the satellite communication system are provided by an application circuit or an application processor coupled to the baseband circuit or the baseband processor.

8. The UE of claim 2, wherein the first priority indication or the second priority indication includes a digital binary signal having a 0 or 1 Boolean value.

9. The UE of claim 2, wherein the one or more processors are configured to determine to use the antenna to access the cellular wireless system when the one or more wireless link metrics indicate the UE is in an RRC connected state, in a voice call state, in an out of service (OOS) state, or the UE accesses the cellular wireless system using a legacy radio access technology (RAT).

10. The UE of claim 2, wherein the one or more processors are configured to determine to use the antenna to access the satellite communication system when the one or more application metrics indicate a low data usage compared to a high data usage record saved before and the one or more service metrics provided by the satellite communication system indicates a request for a L5 service.

11. A method of performing wireless communication by a user equipment (UE), comprising:
   providing a first priority indication to indicate whether to use an antenna to access a land based wireless communication system based on one or more wireless link metrics of the land based wireless communication system or one or more application metrics for applications using the land based wireless communication system;
   providing a second priority indication to indicate whether to use the antenna to access a satellite communication system based on one or more service metrics provided by the satellite communication system; and
   determining to use the antenna to access the land based wireless communication system or the satellite communication system based on the first priority indication and the second priority indication, and further determining to retain the antenna for the land based wireless communication system during a cell search in a Radio Resource Control (RRC) idle case, and release the antenna to the satellite communication system during a time when a screen of the UE is locked.

12. The method of claim 11, wherein the satellite communication system includes a global navigation satellite system (GNSS), and the land based wireless communication system includes at least a cellular wireless system.

13. The method of claim 12, wherein the one or more wireless link metrics of the land based wireless communication system includes an RRC state metric, a cellular link metric, a voice call status, or an out of service (OOS) indication.

14. The method of claim 12, wherein the one or more application metrics includes data usage statistics information for one or more applications operated on the UE.

15. The method of claim 12, wherein the one or more service metrics includes an indication whether an GNSS L5 service is provided.

16. The method of claim 12, wherein the first priority indication or the second priority indication includes a digital binary signal having a 0 or 1 Boolean value.

17. The method of claim 12, wherein the determining to use the antenna to access the cellular wireless system comprises determining to use the antenna to access the cellular wireless system when the one or more wireless link metrics indicate the UE is in an RRC connected state, in a voice call state, in an out of service state, or the UE accesses the cellular wireless system using a legacy radio access technology (RAT).

18. The method of claim 12, wherein the determining to use the antenna to access the satellite communication system comprises determining to use the antenna to access the satellite communication system when the one or more application metrics indicate a low data usage compared to some high data usage record saved before and the one or more service metrics provided by the satellite wireless communication system indicates a request for a L5 service.

19. A non-transitory computer-readable medium storing instructions that, when executed by a processor of a user equipment (UE), cause the UE to perform operations, the operations comprising:
   providing a first priority indication to indicate whether to use an antenna to access a land based wireless communication system based on one or more wireless link metrics of the land based wireless communication system or one or more application metrics for applications using the land based wireless communication system;
   providing a second priority indication to indicate whether to use the antenna to access a satellite communication system based on one or more service metrics provided by the satellite communication system; and
   determining to use the antenna to access the land based wireless communication system or the satellite communication system based on the first priority indication and the second priority indication, and further determining to retain the antenna for the land based wireless communication system during a cell search in a Radio Resource Control (RRC) idle case, and release the antenna to the satellite communication system during a time when a screen of the UE is locked.

20. The non-transitory computer-readable medium of claim 19, wherein the satellite communication system includes a global navigation satellite system (GNSS), and the land based wireless communication system includes at least a cellular wireless system.

* * * * *